(12) United States Patent
Zhao et al.

(10) Patent No.: US 11,858,525 B2
(45) Date of Patent: Jan. 2, 2024

(54) CHASSIS-BY-WIRE CYBER PHYSICAL SYSTEM IN INTELLIGENT TRAFFIC ENVIRONMENT, AND CONTROL METHOD

(71) Applicant: NANJING UNIVERSITY OF AERONAUTICS AND ASTRONAUTICS, Nanjing (CN)

(72) Inventors: Wanzhong Zhao, Nanjing (CN); Xiaochuan Zhou, Nanjing (CN); Chunyan Wang, Nanjing (CN); Zhongkai Luan, Nanjing (CN); Ziyu Zhang, Nanjing (CN); Yixin Zhong, Nanjing (CN); Bo Zhang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/924,995

(22) PCT Filed: Dec. 15, 2021

(86) PCT No.: PCT/CN2021/138518
§ 371 (c)(1),
(2) Date: Nov. 12, 2022

(87) PCT Pub. No.: WO2022/183808
PCT Pub. Date: Sep. 9, 2022

(65) Prior Publication Data
US 2023/0182757 A1    Jun. 15, 2023

(30) Foreign Application Priority Data
Mar. 1, 2021    (CN) .......................... 202110225619.2

(51) Int. Cl.
*B60W 50/12* (2012.01)
*B60W 40/09* (2012.01)
*B60W 50/10* (2012.01)

(52) U.S. Cl.
CPC ............ *B60W 50/12* (2013.01); *B60W 40/09* (2013.01); *B60W 50/10* (2013.01); *B60W 2510/20* (2013.01)

(58) Field of Classification Search
None
See application file for complete search history.

(56) References Cited

U.S. PATENT DOCUMENTS 10,101,745 B1 * 10/2018 Sun ..................... G08G 1/163
10,377,375 B2 * 8/2019 Jones ................ B60W 60/0016
(Continued)

FOREIGN PATENT DOCUMENTS

| CN | 203324777 | 12/2013 |
| CN | 107031600 | 8/2017 |

(Continued)

OTHER PUBLICATIONS

Cloud Control System for Intelligent and Connected Vehicles and Its Application. Li Keqiang, Chang Xueyang, Li Jiawen, Xu Qing, Gao Bolin & Pan Jian. Automotive Engineering.2020( vol. 42) No. 12.

*Primary Examiner* — Jonathan M Dager
(74) *Attorney, Agent, or Firm* — Treasure IP Group, LLC

(57) ABSTRACT

Disclosed are a drive-by-wire chassis cyber-physical system under an intelligent traffic environment and a control method. The system includes: an SoS-level CPS, a system-level CPS, and a unit-level CPS, data transmission is realized between a plurality of unit-level CPSs and one system-level CPS, and data transmission is realized between a plurality of system-level CPSs and one SoS-level CPS. The system integrates a hub motor with a suspension, cancels (Continued)

traditional structures such as an engine and a clutch, and simplifies the structure of a chassis. A motor directly drives a vehicle to run, and different driving, braking or torque is applied to different wheels through four hub motors, so as to meet independent control of the wheels and improve active safety and operational stability.

10 Claims, 4 Drawing Sheets

(56) References Cited

U.S. PATENT DOCUMENTS

| | | | | |
|---|---|---|---|---|
| 10,407,035 | B1* | 9/2019 | Gadda | B60W 10/04 |
| 10,899,340 | B1* | 1/2021 | Hitzinger | B60W 30/02 |
| 10,902,165 | B2* | 1/2021 | Delva | G06F 30/15 |
| 2011/0112716 | A1* | 5/2011 | Joeng | B60W 50/0205 |
| | | | | 701/41 |
| 2017/0122749 | A1* | 5/2017 | Urano | G01S 19/42 |
| 2018/0086336 | A1* | 3/2018 | Jones | B60W 10/18 |
| 2018/0089538 | A1* | 3/2018 | Graham | G06V 20/56 |
| 2018/0162390 | A1* | 6/2018 | Miura | B62D 6/00 |
| 2018/0348769 | A1* | 12/2018 | Sato | B60W 60/0059 |
| 2019/0077402 | A1* | 3/2019 | Kim | B60W 30/12 |
| 2019/0184977 | A1* | 6/2019 | Dhaens | B60W 30/02 |
| 2020/0057453 | A1* | 2/2020 | Laws | G08G 1/22 |
| 2021/0064053 | A1* | 3/2021 | Kim | G07C 5/085 |
| 2021/0269054 | A1* | 9/2021 | Stayton | G01C 21/3605 |
| 2022/0205796 | A1* | 6/2022 | Wray | G01C 21/3407 |
| 2022/0274624 | A1* | 9/2022 | Wray | G01C 21/3407 |
| 2022/0306156 | A1* | 9/2022 | Wray | G01C 21/3658 |
| 2022/0315000 | A1* | 10/2022 | Wray | G05D 1/0212 |
| 2022/0348202 | A1* | 11/2022 | Ostafew | B60W 50/087 |
| 2023/0136682 | A1* | 5/2023 | Zhang | B60W 50/14 |
| | | | | 701/23 |

FOREIGN PATENT DOCUMENTS

| | | |
|---|---|---|
| CN | 108036953 | 5/2018 |
| CN | 108437978 | 8/2018 |
| CN | 108725453 | 11/2018 |
| CN | 108891409 | 11/2018 |
| CN | 108995655 | 12/2018 |
| CN | 201810733593.0 | 12/2018 |
| CN | 109435961 | 3/2019 |
| CN | 109515512 | 3/2019 |
| CN | 109878519 A | 6/2019 |
| CN | 110466359 | 11/2019 |
| CN | 111332302 | 6/2020 |
| CN | 111775721 | 10/2020 |
| CN | 111994086 | 11/2020 |
| CN | 112084698 | 12/2020 |
| CN | 112874502 | 6/2021 |
| DE | 102007057822 | 6/2009 |

* cited by examiner

CHASSIS-BY-WIRE CYBER PHYSICAL SYSTEM IN INTELLIGENT TRAFFIC ENVIRONMENT, AND CONTROL METHOD

TECHNICAL FIELD

The present disclosure belongs to the technical field of vehicle chassis control, and specifically relates to a drive-by-wire chassis cyber-physical system under an intelligent traffic environment and a control method.

BACKGROUND ART

With development of automobile intelligence, electrification and electronization, a drive-by-wire technology has been widely used in automobiles. In the drive-by-wire technology, there is no mechanical connection and mechanical energy transmission between an execution mechanism and an operating mechanism. An operating instruction of an automobile driver is perceived by a sensor and transmitted to the execution mechanism and an electronic controller in a form of an electric signal through Internet.

An execution mechanism of traditional automobile chassis control is mainly implemented by a complex mechanical or hydraulic system, and the driver is still a key component of a control system. Due to various physical factors, various decisions made by the driver aiming at safe traveling of a vehicle will be affected to a certain extent, and traveling of the vehicle has certain hidden dangers. The drive-by-wire chassis collects driver operation information, vehicle traveling information, traffic environment information and the like through the sensor, and converts the collected information into electric signals and transmits the same to an electronic control unit to control work of the execution mechanism. Through a driver intention, combined with a real-time road condition, driver driving decision is adjusted and revised according to the real-time road condition under the intelligent traffic environment, so as to provide the driver with safe assisted driving.

The Chinese invention patent application number CN201510882930.9, titled "a vehicle steering control apparatus, a control method and an automobile", proposes that a steering controller is connected to a steering angle signal collector, a wheel steering control signal is generated according to a steering wheel angle signal, a steering drive motor will control steering of wheels according to the wheel steering control signal. However, since steering of a steering wheel is still controlled by a driver, if a driver operation deviates, there will be certain hidden dangers in traveling of a vehicle. In the Chinese patent invention application number CN201810733593.0, titled "A method for identifying and controlling a driver driving intention", the driver intention is preliminarily identified through collected driver information, vehicle traveling information and traffic environment information, a vehicle traveling state is changed according to the preliminary intention of the driver, and then the driver intention is further identified according to an operation adjusted by the driver and traveling data of the vehicle. This patent only identifies the driver operation intention, and does not correct a driver operation behavior through vehicle traveling information and traffic environment information, and the driver operation is still related to safety of driving.

SUMMARY OF THE INVENTION

In view of the above deficiencies of the prior art, the objective of the present disclosure is to provide a drive-by-wire chassis cyber-physical system under an intelligent traffic environment and a control method to solve the problem in the prior art that it is difficult to realize ideal driving through a driver operation intention and environment information.

For achieving the above objective, the technical solution adopted by the present disclosure is as follows:

A drive-by-wire chassis cyber-physical system under an intelligent traffic environment includes: an SoS-level CPS, a system-level CPS, and a unit-level CPS, data transmission is realized between a plurality of unit-level CPSs and one system-level CPS, and data transmission is realized between a plurality of system-level CPSs and one SoS-level CPS;

the unit-level CPS is a drive-by-wire chassis and includes: a driver input module, a basic control module, an execution module, and an environment perception module;

the driver input module includes: an accelerator pedal and a stroke and force sensor thereof, a brake pedal and a stroke and force sensor thereof, a steering wheel and a steering angle and torque sensor thereof, and a wheel steering angle sensor, for perceiving driving, braking and steering information input by a driver to a vehicle, so as to realize extraction of a driver operation intention;

the basic control module processes data collected by each sensor, formulates an optimal traveling strategy according to a current working condition, and transmits the optimal traveling strategy to the execution module;

the execution module is configured to receive the optimal traveling strategy of the basic control module, and manipulate the vehicle;

the environment perception module includes: a detection device, a positioning device, and a communication device; the detection device is configured to perceive information outside the vehicle and information about a road condition ahead; the positioning device is configured to position the vehicle; and the communication device is configured for vehicle-to-vehicle communication and vehicle-to-base station communication so as to obtain real-time working condition information in a vehicle traveling process;

the system-level CPS is a supervision platform and includes: a collaborative control module and a real-time monitoring and diagnosis module, for supervising a driving behavior of vehicles loaded with drive-by-wire chassis on the same road;

the collaborative control module is configured to obtain sensor data of the supervised drive-by-wire chassis and execution information issued by the execution module, obtain a local optimal solution under a current working condition through information interaction and real-time analysis, and issue a control signal to the basic control module; and the real-time monitoring and diagnosis module is configured to monitor and diagnose a driving situation of the vehicles loaded with the drive-by-wire chassis;

the SoS-level CPS is a big data platform and includes: a data storage unit, a data interaction module, and a data analysis module, and performs data transmission with each supervision platform through Internet; and the data storage unit is configured to store data transmitted to the big data platform; the data interaction module is configured for transmission of the sensor data and the execution information between the drive-by-wire chassis and the supervision platform; and the data analysis module is configured to analyze the data transmitted to the big data platform, so as to obtain an ideal operation of the drive-by-wire chassis, and judge whether a driving operation of the drive-by-wire chassis is the ideal operation.

Further, the basic control module includes: a central control unit, a steering control unit, a braking control unit and a driving control unit; and the central control unit is configured to monitor and control the steering control unit, the braking control unit and the driving control unit, and receive each sensor signal to calculate a vehicle speed and distribute steering force, braking force and driving force.

Further, the optimal traveling strategy is an execution state of the execution module conforming to the current working condition, and the optimal traveling strategy includes: an optimal steering strategy, an optimal braking strategy, an optimal driving strategy, and an optimal composite traveling strategy; the optimal steering strategy, the optimal braking strategy and the optimal driving strategy are formulated under a single working condition of steering, braking and driving respectively; the optimal composite traveling strategy is a combination of the optimal steering strategy and the optimal braking strategy or the optimal driving strategy; the optimal steering strategy includes that actual energy consumption of a steering execution motor is minimum, and a wheel steering angle does not need to be corrected by the driver, the optimal braking strategy includes that energy consumption of a brake motor is minimum, an execution time of a braking execution mechanism is shortest, and correction by the driver is not needed in an execution process of the braking execution mechanism; and the optimal driving strategy includes that energy consumption of a hub motor is minimum, an execution time of a driving execution mechanism is shortest, and correction by the driver is not needed in an execution process of the driving execution mechanism.

Further, the execution module includes: a wheel, the hub motor, the steering execution motor, a steering controller, a steering shaft, a transmission shaft, a rack and pinion steering gear, a steering pull rod, a brake controller, the braking execution mechanism, a brake motor, a driving controller, and a driving execution mechanism.

Further, the information outside the vehicle includes: information of a road lane line, a road surface arrow sign, a roadside traffic sign, and a traffic light.

Further, the information about the road condition ahead includes a bumpy obstacle, a vehicle, and a pedestrian ahead.

Further, the local optimal solution is a traveling behavior of all the drive-by-wire chassis of the same supervision platform, including steering, braking, driving, steering and braking, and steering and driving.

Further, the data transmitted to the big data platform includes: sensor data, execution information, the information outside the vehicle, the information about the road condition ahead, position information, vehicle-to-vehicle communication information, vehicle-to-base station communication information, and the local optimal solution generated by the supervision platform.

Further, the ideal operation of the drive-by-wire chassis is data in an ideal operation database, including an ideal steering wheel angle, an ideal brake pedal opening degree, and an ideal accelerator pedal opening degree; the ideal steering wheel angle is a magnitude of a steering wheel angle required by a desired path planned by the data analysis module; the ideal brake pedal opening degree is a brake pedal opening degree planned by the data analysis module to maintain a traffic safe distance from ahead and surrounding obstacles and ensure the driving comfort of the driver; and the ideal accelerator pedal opening degree is an accelerator pedal opening degree planned by the data analysis module and meeting a speed requirement of a traffic environment to ensure the driving comfort of the driver and maintain the traffic safety distance from the surrounding obstacles.

Further, the ideal operation database is an offline synchronization database, which consists of vehicle engineer experience data, automobile dynamic and kinematic model data, and automobile traveling data in the traffic environment by offline synchronization; the data in the ideal operation database are all within a range of safe driving and ensuring the comfort of the driver; the vehicle engineer experience data includes driver comfort data under driver steering, braking, driving, steering and braking or driving conditions, and nonlinear mathematical model data of driver steering, braking and driving operating force as well as the vehicle speed and acceleration; the automobile dynamic and kinematic model includes a dynamic and kinematic equation during steering, braking and driving execution calculated by Newton's laws of motion, and current equations of the steering execution motor, the brake motor, the driving motor and the hub motor during steering, braking, and driving execution calculated by a Kirchhoff's law; and the automobile traveling data in the traffic environment is driving information data stored by a networked drive-by-wire chassis automobile in a networked condition. Further, a steering connection relationship between the driver input module, the basic control module and the execution module is as follows: the steering wheel angle and torque sensor is integrated on a steering wheel, the steering wheel is connected to the transmission shaft through the steering shaft, the transmission shaft is connected to the rack and pinion steering gear, and the rack and pinion steering gear is connected to the steering pull rod; the steering execution motor is fixed to the transmission shaft, when the steering wheel is turned, the steering angle and torque sensor works, the steering controller will collect and transmit steering wheel angle and torque and wheel steering angle information to the steering control unit, and the steering control unit controls current output of the steering execution motor according to the sensor information so as to control steering of the transmission shaft; and the steering controller is connected to the hub motor to control rotation of the four wheels.

Further, a braking connection relationship between the driver input module, the basic control module and the execution module is as follows: when the brake pedal is stepped on, the stroke and force sensor of the brake pedal works, the brake controller will collect and transmit stroke and force sensor information of the brake pedal to the braking control unit, and the braking control unit controls current output of the brake motor according to the sensor information, and then controls the execution state of the braking execution mechanism to realize braking of the vehicle; and the brake controller is connected to the hub motor to control a rotation state of the wheels during braking.

Further, a driving connection relationship between the driver input module, the basic control module and the execution module is as follows: when the accelerator pedal is stepped on, the stroke and force sensor of the accelerator pedal works, the driving controller will collect and transmit stroke and force sensor information of the accelerator pedal to the driving control unit, and the driving control unit controls the execution state of the driving execution mechanism according to the sensor information to realize driving of the vehicle; and the driving controller is connected to the hub motor of the wheels to control a rotation state of the wheels during accelerating.

Further, the hub motor includes: a left front wheel hub motor, a right front wheel hub motor, a left rear wheel hub motor and a right rear wheel hub motor, and the four wheel hub motors are respectively integrated in corresponding four wheel hubs for driving the wheels.

The drive-by-wire chassis, the supervision platform, and the big data platform complete data transmission through the Internet.

The data transmission process is as follows: the drive-by-wire chassis obtains driver operation information and environment information after the driver completes the driving operation, and transmits the operation information and environment information to the supervision platform; the real-time monitoring and diagnosis module of the supervision platform performs real-time monitoring and diagnosis on the driver operation information and environment information transmitted by the drive-by-wire chassis, and transmits a diagnosis result to the big data platform; the big data platform completes information storage and interaction, obtains operation behavior information of the drive-by-wire chassis through the data analysis module, and transmits the operation behavior information to the supervision platform; the collaborative control module of the supervision platform generates the local optimal solution according to the information transmitted by the big data platform, and transmits the local optimal solution to the drive-by-wire chassis; and the basic control module of the drive-by-wire chassis forms the optimal traveling strategy according to the local optimal solution, and the execution module controls the vehicle according to the optimal traveling strategy.

Secondly, the present application further provides a control method of a drive-by-wire chassis cyber-physical system under an intelligent traffic environment, including the following steps:

1) issuing an operating signal by a driver;
2) obtaining information of an environment perception module of a drive-by-wire chassis and sensor information of a driver input module;
3) judging, by a basic control module, a driver operation according to the sensor information of the driver input module, and transmitting driver operation information and the information of the environment perception module to a supervision platform;
4) performing, by the supervision platform, real-time monitoring and diagnosis on information of the drive-by-wire chassis, and judging whether a current driver operation conforms to a current working condition; if yes, transmitting the information of the driver operation and the environment perception module obtained by the supervision platform to a big data platform; and if not, adjusting, by the supervision platform, the driver operation according to the information of the environment perception module to conform to the current working condition, and transmitting the information of the environment perception module and the adjusted driver operation information to the big data platform;
5) storing, by the big data platform, the operation information transmitted by the supervision platform;
6) analyzing, by the big data platform, the driver operation information transmitted by the supervision platform; if an analysis result of the driver operation information in the supervision platform is an ideal driving operation, feeding back the driver operation information to the supervision platform; and if there is an error between the analysis result of the driver operation information and the ideal driving operation information, feeding back the ideal driving operation information obtained by data analysis to the supervision platform;
7) forming, by the supervision platform, a real-time local optimal solution for a vehicle according to the feedback information, and feeding back the local optimal solution to a drive-by-wire chassis supervised by the current supervision platform; and
8) generating, by a central control unit, an optimal traveling strategy corresponding to the local optimal solution, and transmitting the optimal traveling strategy to a steering control unit, a braking control unit and a driving control unit to control an output current of a motor in an execution module, so that a controller controls other execution mechanisms in the execution module to complete output to the vehicle.

Further, the operation signal sent by the driver in step 1) includes: steering, braking, driving and composite operation signals, wherein the composite operation signal is a combination of steering and braking or driving.

Further, in step 2), a current steering wheel angle and torque, a wheel steering angle, a brake pedal stroke, and an accelerator pedal stroke of the vehicle are obtained through a sensor, and information outside the vehicle, information about a road condition ahead, position information, vehicle-to-vehicle communication information, and vehicle-to-base station communication information under the current working condition are obtained through a detection device, a positioning device and a communication device in the environment perception module.

Further, the driver operation in step 3) includes: steering, braking, driving and composite operations, wherein the composite operation includes a combination of steering and braking or driving.

Further, in step 4), if a supervision platform of any road fails, a supervision platform of any other road takes over data information of the failed supervision platform to perform real-time monitoring and diagnosis on drive-by-wire chassis in a current road and a road corresponding to the failed supervision platform to ensure stability of the traffic environment information.

Further, the current working condition of step 4) includes a steering working condition, a braking working condition, an acceleration working condition, and a combined working condition of the steering working condition and the braking working condition or the acceleration working condition, wherein the steering working condition includes passing through a curve, overtaking and lane changing; the braking working condition includes deceleration of a vehicle ahead and a distance from the vehicle ahead being less than a traffic safety distance, emergency obstacle avoidance parking, and passing through a speed limit road section when the vehicle speed is higher than the speed limit; and the acceleration working condition includes vehicle starting, passing through the speed limit section when the vehicle speed is lower than the speed limit, and overtaking.

Further, in step 6), if there is an error between the current driver operation and the ideal driving operation, the central control unit controls the steering, braking, and driving control units to drive a hub motor, a steering execution motor and a brake motor to output additional control quantities to minimize the error between the driver operation and the ideal driving operation, wherein a control algorithm used is an H∞ feedback control algorithm, which specifically includes the following contents:
61) expressing a deviation between a steering wheel angle $\theta_{sw}$ output by the driver and an ideal steering wheel angle $\theta_{sw}^*$ as $e_1$; expressing a deviation between a brake pedal opening degree p output by the driver and an ideal brake pedal opening degree p* as $e_2$; and expressing a deviation between an accelerator pedal opening degree q output by the driver and an ideal accelerator pedal opening degree q* as $e_3$;
62) the deviations $e_1$, $e_2$ and $e_3$ being input of an H∞ feedback controller K(s), calculating, by the feedback controller K(s), additional steering angles $\theta_1$, $\theta_2$ and $\theta_3$ needing to be output by the steering execution motor, the brake motor and the hub motor according to the input deviation $e_1$, $e_2$ and $e_3$, and then controlling, by the central control unit, the steering control unit, the braking control unit and the driving control unit respectively, the steering execution motor, the brake motor and the hub motor to output the corresponding additional steering angles $\theta_1$, $\theta_2$ and $\theta_3$;
63) enabling the additional steering angles $\theta_1$, $\theta_2$ and $\theta_3$ to act on a drive-by-wire chassis system, and then affect a traveling state of the vehicle, and meanwhile, the performing, by the driver, a corresponding driving operation according to a current vehicle state so as to obtain a new set of deviations $e_4$, $e_5$ and $e_6$; and
64) repeating steps 61)-63) until the deviations $e_i$ (i=1, 2, 3, . . . ) are eliminated.

Further, the motor in step 8) includes the steering execution motor, the brake motor and the hub motor; the controller includes the steering controller, the brake controller, and the driving controller, and the other execution mechanisms are execution mechanisms in the execution module except for the execution motor, the brake motor, the hub motor, the steering controller, the brake controller, and the driving controller.

Beneficial Effects of the Present Disclosure

The present disclosure integrates the hub motor with a suspension, cancels traditional structures such as an engine and a clutch, and simplifies the structure of a chassis. The motor can directly drive the vehicle to run, and different driving, braking or torque is applied to different wheels through four hub motors, so as to meet independent control of the wheels and improve active safety and operational stability.

The present disclosure integrates the intelligent traffic environment, takes the drive-by-wire chassis as an integral part of the cyber-physical system, integrates information technologies and automatic control technologies such as perception, computing, communication and control, meanwhile can combine human, a machine, an object, an environment, information and other elements in a physical space and an information space to form a closed loop of "perception-analysis-decision-execution" of an intelligent vehicle.

The present disclosure obtains the driver intention and the environment information through the sensor of the drive-by-wire chassis and the detection, positioning and communication devices, obtains the information of the vehicles traveling on the road through the cyber-physical system, obtains more real-time traffic working condition information based on the intelligent traffic environment, and relieves the deficiencies of a traditional technology that the information of vehicle safety control is obtained only based on driving information read by the vehicle sensor and surrounding real-time working condition information obtained by laser and radar, and there is a lack of the reading of driving behavior information of other vehicles on the road.

The present disclosure can analyze an ideal driving operation action of the vehicle under the current working condition, the central control unit of the drive-by-wire chassis obtains the optimal traveling strategy according to the ideal driving operation, and the drive-by-wire chassis will diagnose the driver intention according to the analysis result of the supervision platform, and correct the error of steering or braking. The traveling safety of the vehicle is improved through the control of each module of the drive-by-wire chassis. The deficiencies in the prior art that a driver monitoring system only issues a warning to a driver in case of mis-operation of the driver, and in severe cases, a vehicle is forced to slow down or lock are relieved.

The supervision platforms in the drive-by-wire chassis cyber-physical system of the present disclosure can communicate, interconnect, and interoperate with the support of the big data platform, and through the drive-by-wire chassis cyber-physical system, the information of all the vehicles traveling on the road can be monitored, diagnosed, and subjected to data analysis, which improves the accuracy of traffic environment prediction. In addition, if one of the supervision platforms fails, the other supervision platforms can take over the failed supervision platform in time to ensure the stability of the information input of the intelligent traffic environment.

DETAILED DESCRIPTION OF THE INVENTION

In order to facilitate the understanding of those skilled in the art, the present disclosure will be further illustrated below with reference to the embodiments and the accompanying drawings, and the contents mentioned in the implementations are not intended to limit the present disclosure.

Figure 1:
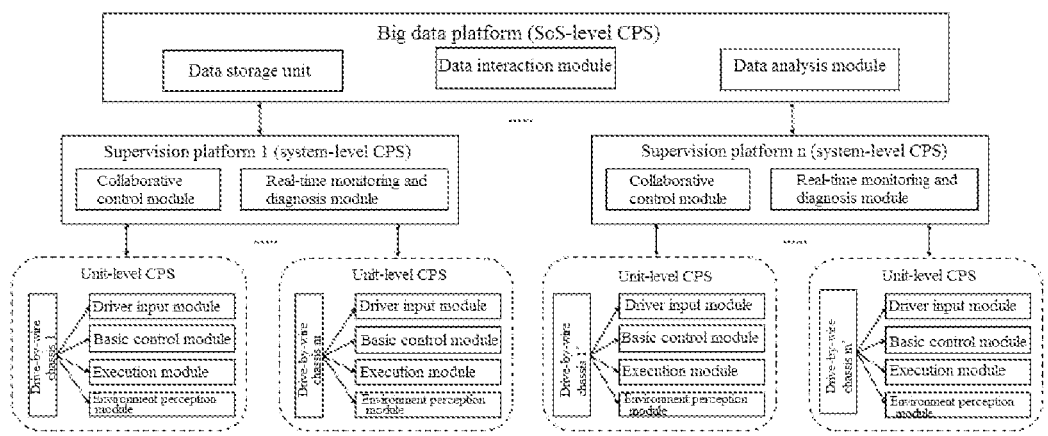
FIG. 1 is a schematic structural diagram of a drive-by-wire chassis cyber-physical system according to an embodiment of the present application.

Referring to FIG. 1, a drive-by-wire chassis cyber-physical system under an intelligent traffic environment according to the present disclosure includes: an SoS-level CPS, a system-level CPS, and a unit-level CPS, through Internet, data transmission is realized between a plurality of unit-level CPSs and one system-level CPS, and data transmission is realized between a plurality of system-level CPSs and one SoS-level CPS.

Figure 2:
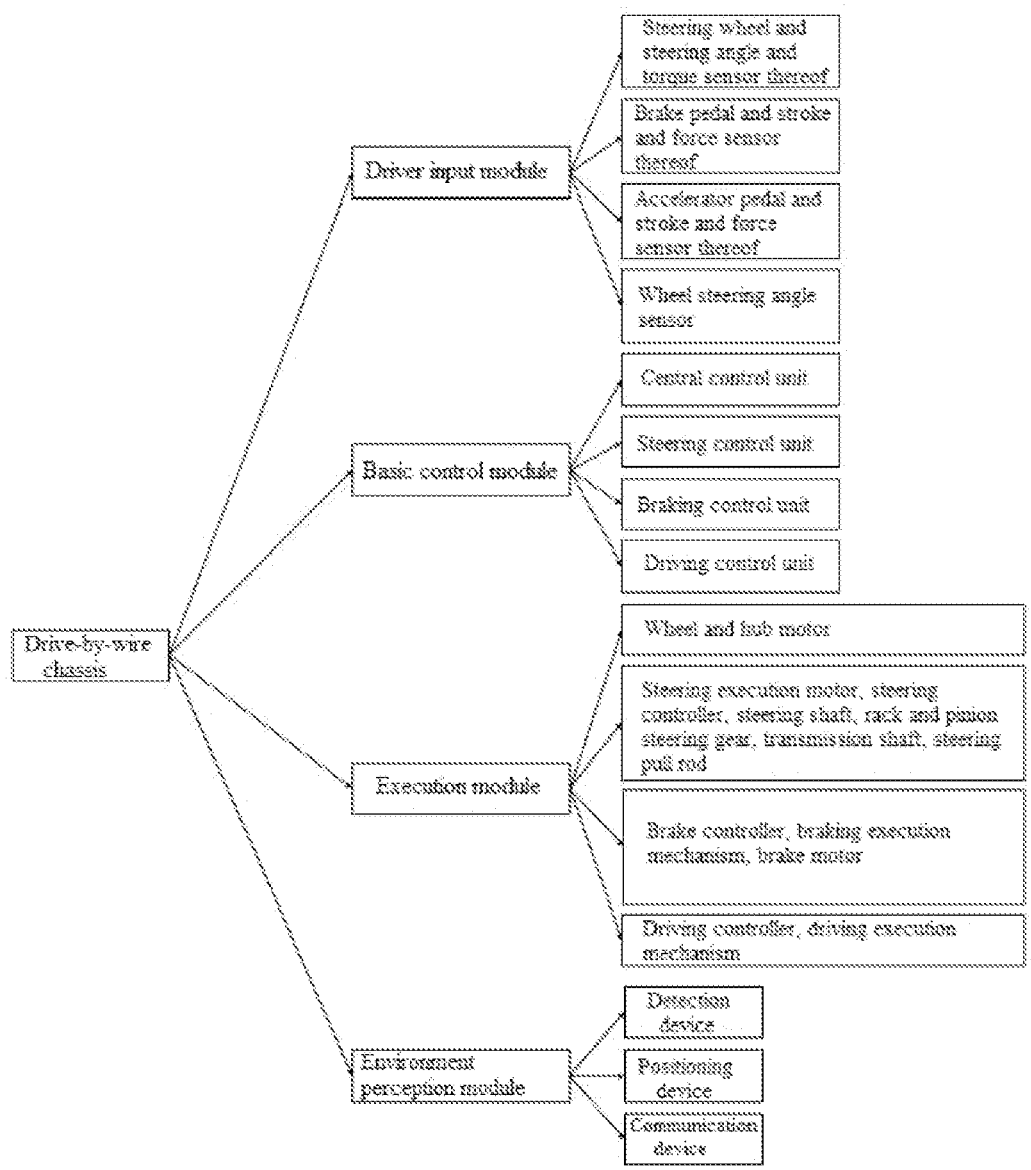
FIG. 2 is a structural diagram of a drive-by-wire chassis according to an embodiment of the present application.

The unit-level CPS is a drive-by-wire chassis, as shown in FIG. 2, including: a driver input module, a basic control module, an execution module, and an environment perception module.

The driver input module includes: an accelerator pedal and a stroke and force sensor thereof, a brake pedal and a stroke and force sensor thereof, a steering wheel and a steering angle and torque sensor thereof, and a wheel steering angle sensor, for perceiving driving, braking and steering information input by a driver to a vehicle, so as to realize extraction of a driver operation intention.

The basic control module processes data collected by each sensor, formulates an optimal traveling strategy according to a current working condition, and transmits the optimal traveling strategy to the execution module.

The execution module is configured to receive the optimal traveling strategy of the basic control module, and manipulate the vehicle.

The execution module includes: a wheel, a hub motor, a steering execution motor, a steering controller, a steering shaft, a transmission shaft, a rack and pinion steering gear, a steering pull rod, a brake controller, a braking execution mechanism, a brake motor, a driving controller, and a driving execution mechanism.

The optimal traveling strategy is an execution state of the execution module conforming to a current working condition, and the optimal traveling strategy includes: an optimal steering strategy, an optimal braking strategy, an optimal driving strategy, and an optimal composite traveling strategy; the optimal steering strategy, the optimal braking strategy and the optimal driving strategy are formulated under a single working condition of steering, braking and driving respectively; the optimal composite traveling strategy is a combination of the optimal steering strategy and the optimal braking strategy or the optimal driving strategy; the optimal steering strategy includes that actual energy consumption of the steering execution motor is minimum, and a wheel steering angle does not need to be corrected by the driver, the optimal braking strategy includes that energy consumption of the brake motor is minimum, an execution time of the braking execution mechanism is shortest, and correction by the driver is not needed in an execution process of the braking execution mechanism; and the optimal driving strategy includes that energy consumption of the hub motor is minimum, an execution time of the driving execution mechanism is shortest, and correction by the driver is not needed in an execution process of the driving execution mechanism.

The environment perception module includes: a detection device, a positioning device, and a communication device; the detection device is configured to perceive information outside the vehicle and information about a road condition ahead; the positioning device is configured to position the vehicle; and the communication device is configured for vehicle-to-vehicle communication and vehicle-to-base station communication so as to obtain real-time working condition information in a vehicle traveling process.

The basic control module includes: a central control unit, a steering control unit, a braking control unit and a driving control unit; and the central control unit is configured to monitor and control the steering control unit, the braking control unit and the driving control unit, and receive each sensor signal to calculate a vehicle speed and distribute steering force, braking force and driving force.

The system-level CPS is a supervision platform and includes: a collaborative control module and a real-time monitoring and diagnosis module, for supervising a driving behavior of vehicles loaded with drive-by-wire chassis on the same road.

The collaborative control module is configured to obtain sensor data of the supervised drive-by-wire chassis and execution information issued by the execution module, obtain a local optimal solution under a current working condition through information interaction and real-time analysis, and issue a control signal to the basic control module; and the real-time monitoring and diagnosis module is configured to monitor and diagnose a driving situation of the vehicles loaded with the drive-by-wire chassis.

The SoS-level CPS is a big data platform and includes: a data storage unit, a data interaction module, and a data analysis module, and performs data transmission with each supervision platform through Internet.

The data storage unit is configured to store data transmitted to the big data platform; the data interaction module is configured for transmission of the sensor data and the execution information between the drive-by-wire chassis and the supervision platform; and the data analysis module is configured to analyze the data transmitted to the big data platform, so as to obtain an ideal operation of the drive-by-wire chassis, and judge whether a driving operation of the drive-by-wire chassis is the ideal operation.

In addition, the information outside the vehicle includes: information of a road lane line, a road surface arrow sign, a roadside traffic sign, and a traffic light.

The information about the road condition ahead includes a bumpy obstacle, a vehicle, and a pedestrian ahead.

The local optimal solution is a traveling behavior of all the drive-by-wire chassis of the same supervision platform, including steering, braking, driving, steering and braking, and steering and driving.

The data transmitted to the big data platform includes: sensor data, execution information, the information outside the vehicle, the information about the road condition ahead, position information, vehicle-to-vehicle communication information, vehicle-to-base station communication information, and the local optimal solution generated by the supervision platform.

The ideal operation of the drive-by-wire chassis is data in an ideal operation database, including an ideal steering wheel angle, an ideal brake pedal opening degree, and an ideal accelerator pedal opening degree; the ideal steering wheel angle is a magnitude of a steering wheel angle required by a desired path planned by the data analysis module; the ideal brake pedal opening degree is a brake pedal opening degree planned by the data analysis module to maintain a traffic safe distance from ahead and surrounding obstacles and ensure the driving comfort of the driver; and the ideal accelerator pedal opening degree is an accelerator pedal opening degree planned by the data analysis module and meeting a speed requirement of a traffic environment to ensure the driving comfort of the driver and maintain the traffic safety distance from the surrounding obstacles.

The ideal operation database is an offline synchronization database, which consists of vehicle engineer experience data, automobile dynamic and kinematic model data, and automobile traveling data in the traffic environment by offline synchronization; the data in the ideal operation database are all within a range of safe driving and ensuring the comfort of the driver; the vehicle engineer experience data includes driver comfort data under driver steering, braking, driving, steering and braking or driving conditions, and nonlinear mathematical model data of driver steering, braking and driving operating force as well as the vehicle speed and acceleration; the automobile dynamic and kinematic model includes a dynamic and kinematic equation during steering, braking and driving execution calculated by Newton's laws of motion, and current equations of the steering execution motor, the brake motor, the driving motor and the hub motor during steering, braking, and driving execution calculated by a Kirchhoff's law; and the automobile traveling data in the traffic environment is driving information data stored by a networked drive-by-wire chassis automobile in a networked condition. Further, a steering connection relationship between the driver input module, the basic control module and the execution module is as follows: the steering wheel angle and torque sensor is integrated on a steering wheel, the steering wheel is connected to the transmission shaft through the steering shaft, the transmission shaft is connected to the rack and pinion steering gear, and the rack and pinion steering gear is connected to the steering pull rod; the steering execution motor is fixed to the transmission shaft, when the steering wheel is turned, the steering angle and torque sensor works, the steering controller will collect and transmit steering wheel angle and torque and wheel steering angle information to the steering control unit, and the steering control unit controls current output of the steering execution motor according to the sensor information so as to control steering of the transmission shaft; and the steering controller is connected to the hub motor to control rotation of the four wheels.

A braking connection relationship between the driver input module, the basic control module and the execution module is as follows: when the brake pedal is stepped on, the stroke and force sensor of the brake pedal works, the brake controller will collect and transmit stroke and force sensor information of the brake pedal to the braking control unit, and the braking control unit controls current output of the brake motor according to the sensor information, and then controls the execution state of the braking execution mechanism to realize braking of the vehicle; and the brake controller is connected to the hub motor to control a rotation state of the wheels during braking.

A driving connection relationship between the driver input module, the basic control module and the execution module is as follows: when the accelerator pedal is stepped on, the stroke and force sensor of the accelerator pedal works, the driving controller will collect and transmit stroke and force sensor information of the accelerator pedal to the driving control unit, and the driving control unit controls the execution state of the driving execution mechanism according to the sensor information to realize driving of the vehicle; and the driving controller is connected to the hub motor of the wheels to control a rotation state of the wheels during accelerating.

The hub motor includes: a left front wheel hub motor, a right front wheel hub motor, a left rear wheel hub motor and a right rear wheel hub motor; and the four wheel hub motors are respectively integrated in corresponding four wheel hubs for driving the wheels.

The drive-by-wire chassis, the supervision platform, and the big data platform complete data transmission through the Internet.

The data transmission process is as follows: the drive-by-wire chassis obtains driver operation information and environment information after the driver completes the driving operation, and transmits the operation information and environment information to the supervision platform; the real-time monitoring and diagnosis module of the supervision platform performs real-time monitoring and diagnosis on the driver operation information and environment information transmitted by the drive-by-wire chassis, and transmits a diagnosis result to the big data platform; the big data platform completes information storage and interaction, obtains operation behavior information of the drive-by-wire chassis through the data analysis module, and transmits the operation behavior information to the supervision platform; the collaborative control module of the supervision platform generates the local optimal solution according to the information transmitted by the big data platform, and transmits the local optimal solution to the drive-by-wire chassis; and the basic control module of the drive-by-wire chassis forms the optimal traveling strategy according to the local optimal solution, and the execution module controls the vehicle according to the optimal traveling strategy.

Figure 3:
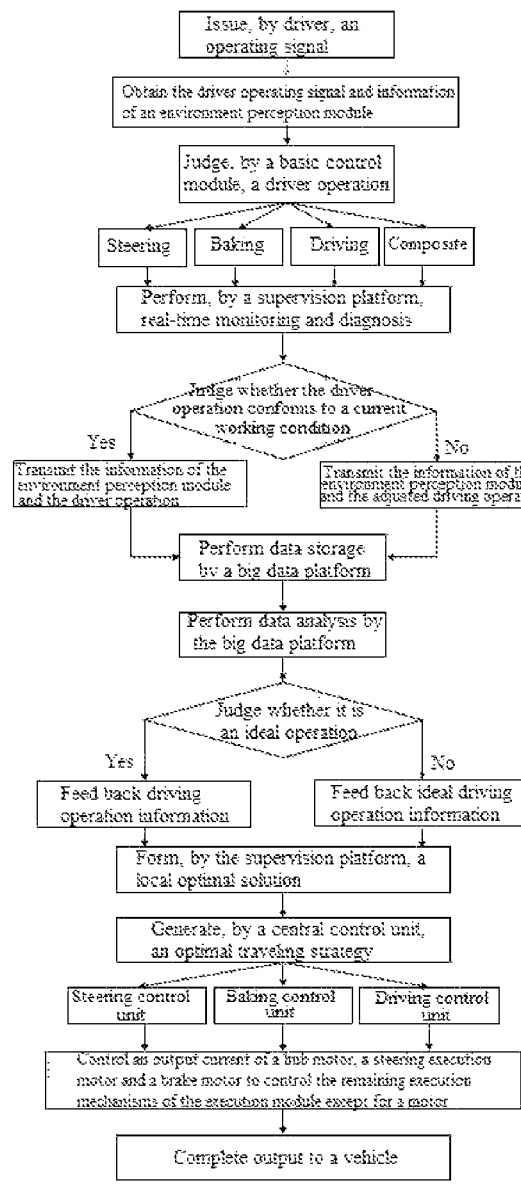
FIG. 3 is a flow chart of specific implementation of a method according to an embodiment of the present application.

As shown in FIG. 3, the present embodiment further provides a control method of a drive-by-wire chassis cyber-physical system under an intelligent traffic environment based on the above system. Specific steps are as follows:

1) An operation signal is issued by the driver, and the operation signal sent by the driver includes: steering, braking, driving and composite operation signals, wherein the composite operation signal is a combination of steering and braking or driving.

2) Information of the environment perception module of the drive-by-wire chassis and sensor information of the driver input module are obtained.

In step 2), a current steering wheel angle and torque, a wheel steering angle, a brake pedal stroke, and an accelerator pedal stroke of a vehicle are obtained through a sensor, and information outside the vehicle, information about a road condition ahead, position information, vehicle-to-vehicle communication information, and vehicle-to-base station communication information under the current working condition are obtained through a detection device, a positioning device and a communication device in the environment perception module.

3) A driver operation is judged by the basic control module according to the sensor information of the driver input module, and driver operation information and the information of the environment perception module are transmitted to the supervision platform. The driver operation includes: steering, braking, driving and composite operations, wherein the composite operation includes a combination of steering and braking or driving.

4) Real-time monitoring and diagnosis on information of the drive-by-wire chassis is performed by the supervision platform, and whether a current driver operation conforms to a current working condition is judged; if yes, the information of the driver operation and the environment perception module obtained by the supervision platform are transmitted to the big data platform; and if not, the driver operation is adjusted by the supervision platform according to the information of the environment perception module to conform to the current working condition, and the information of the environment perception module and the adjusted driver operation information are transmitted to the big data platform.

In step 4), if a supervision platform of any road fails, a supervision platform of any other road takes over data information of the failed supervision platform to perform real-time monitoring and diagnosis on drive-by-wire chassis in a current road and a road corresponding to the failed supervision platform to ensure stability of the traffic environment information.

The current working condition of step 4) includes a steering working condition, a braking working condition, an acceleration working condition, and a combined working condition of the steering working condition and the braking working condition or the acceleration working condition, wherein the steering working condition includes passing through a curve, overtaking and lane changing; the braking working condition includes deceleration of a vehicle ahead and a distance from the vehicle ahead being less than a traffic safety distance, emergency obstacle avoidance parking, and passing through a speed limit road section when the vehicle speed is higher than the speed limit; and the acceleration working condition includes vehicle starting, passing through the speed limit section when the vehicle speed is lower than the speed limit, and overtaking.

5) The operation information transmitted by the supervision platform is stored by the big data platform.

6) The driver operation information transmitted by the supervision platform is analyzed by the big data platform; if an analysis result of the driver operation information in the supervision platform is an ideal driving operation, the driver operation information is fed back to the supervision platform; and if there is an error between the analysis result of the driver operation information and the ideal driving operation information, the ideal driving operation information obtained by data analysis is fed back to the supervision platform.

Figure 4:
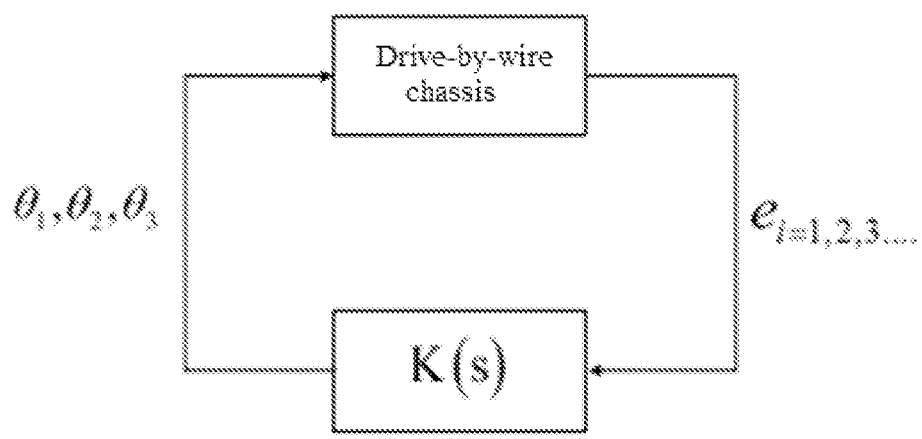
FIG. 4 is a structural diagram of H∞ feedback control according to an embodiment.

In step 6), if there is an error between the current driver operation and the ideal driving operation, the steering, braking, and driving control units are controlled by the central control unit to drive the hub motor, the steering execution motor and the brake motor to output additional control quantities to minimize the error between the driver operation and the ideal driving operation, wherein a control algorithm used is an H∞ feedback control algorithm, referring to FIG. 4, which specifically includes the following contents:

61) expressing a deviation between a steering wheel angle $\theta_{sw}$ output by the driver and an ideal steering wheel angle $\theta_{sw}*$ as $e_1$; expressing a deviation between a brake pedal opening degree p output by the driver and an ideal brake pedal opening degree p* as $e_2$; and expressing a deviation between an accelerator pedal opening degree q output by the driver and an ideal accelerator pedal opening degree q* as $e_3$;

62) the deviations $e_1$, $e_2$ and $e_3$ being input of an H∞ feedback controller K(s), calculating, by the feedback controller K(s), additional steering angles $\theta_1$, $\theta_2$ and $\theta_3$ needing to be output by the steering execution motor, the brake motor and the hub motor according to the input deviation $e_1$, $e_2$ and $e_3$, and then controlling, by the central control unit, the steering control unit, the braking control unit and the driving control unit respectively, the steering execution motor, the brake motor and the hub motor to output the corresponding additional steering angles $\theta_1$, $\theta_2$ and $\theta_3$;

63) enabling the additional steering angles $\theta_1$, $\theta_2$ and $\theta_3$ to act on a drive-by-wire chassis system, and then affect a traveling state of the vehicle, and meanwhile, the performing, by the driver, a corresponding driving operation according to a current vehicle state so as to obtain a new set of deviations $e_4$, $e_5$ and $e_6$; and 64) repeating steps 61)-63) until the deviations $e_i$ (i=1, 2, 3, . . . ) are eliminated.

7) A real-time local optimal solution for the vehicle is formed by the supervision platform according to the feedback information, and fee back the local optimal solution to a drive-by-wire chassis supervised by the current supervision platform.

8) An optimal traveling strategy corresponding to the local optimal solution is generated by the central control unit, and transmitted to the steering control unit, the braking control unit and the driving control unit to control an output current of the motor in an execution module, so that a controller controls other execution mechanisms in the execution module to complete output to the vehicle.

The motor in step 8) includes the steering execution motor, the brake motor and the hub motor; the controller includes the steering controller, the brake controller, and the driving controller, and the other execution mechanisms are execution mechanisms in the execution module except for the execution motor, the brake motor, the hub motor, the steering controller, the brake controller, and the driving controller.

In accordance with the aspects of the present invention, the basic control module, the execution module, environment perception module, collaborative control module, the real-time monitoring and diagnosis module, execution module, data interaction module, together with controllers and units, are considered as one or more computer processors, capable of executing a program, strategy, or algorithm thereon. The present disclosure has many specific application ways. The above mentioned is only preferred implementations of the present disclosure. It should be noted that those skilled in the art can further make various improvements without departing from the principle of the present disclosure, and these improvements should also be regarded as the protection scope of the present disclosure.

The invention claimed is:

1. A drive-by-wire chassis cyber-physical system (CPS) under an intelligent traffic environment, comprising:

a Strength of Signal (SoS)-level CPS, a system-level CPS, and a unit-level CPS, wherein data transmission is realized between a plurality of unit-level CPSs and one system-level CPS, and data transmission is realized between a plurality of system-level CPSs and one SoS-level CPS;

the unit-level CPS is a drive-by-wire chassis and comprises: a driver input module, a basic control module, an execution module, and an environment perception module;

the driver input module comprises: an accelerator pedal and a stroke and force sensor thereof, a brake pedal and stroke and force sensor thereof, a steering wheel and a steering angle and torque sensor thereof, and a wheel steering angle sensor, for perceiving driving, braking and steering information input by a driver to a vehicle, so as to realize extraction of a driver operation intention; one or more computer processors configured to process data collected by each sensor, formulate an optimal traveling strategy according to a current working condition, and transmit the optimal traveling strategy to the execution module;

receive the optimal traveling strategy of the basic control module, and manipulate the vehicle;

perceive information outside the vehicle and information about a road condition ahead; position the vehicle; and provide vehicle-to-vehicle communication and vehicle-to-base station communication so as to obtain real-time working condition information in a vehicle traveling process;

to supervise a driving behavior of vehicles loaded with drive-by-wire chassis on the same road;

obtain sensor data of the supervised drive-by-wire chassis and execution information issued by the one or more computer processors, obtain a local optimal solution under a current working condition through information interaction and real-time analysis, and issue a control signal; and to monitor and diagnose a driving situation of the vehicles loaded with the drive-by-wire chassis;

perform data transmission with each supervision platform through Internet; and store data transmitted to the big data platform; transmit the sensor data and the execution information between the drive-by-wire chassis and the one or more computer processors; and to analyze the data transmitted to the big data platform, so as to obtain an ideal operation of the drive-by-wire chassis, and judge whether a driving operation of the drive-by-wire chassis is an ideal operation.

2. The drive-by-wire chassis cyber-physical system under an intelligent traffic environment according to claim 1, wherein the one or more computer processors are configured further to receive each sensor signal to calculate a vehicle speed and distribute steering force, braking force and driving force.

3. The drive-by-wire chassis cyber-physical system under an intelligent traffic environment according to claim 1, wherein the one or more computer processor are configured to execute an optimal traveling strategy, wherein the optimal traveling strategy is an execution state of the execution module conforming to the current working condition, and the optimal traveling strategy comprises: an optimal steering strategy, an optimal braking strategy, an optimal driving strategy, and an optimal composite traveling strategy; the optimal steering strategy, the optimal braking strategy and the optimal driving strategy are formulated under a single working condition of steering, braking and driving respectively; the optimal composite traveling strategy is a combination of the optimal steering strategy and the optimal braking strategy or the optimal driving strategy; the optimal steering strategy comprises that actual energy consumption of a steering execution motor is minimum, and a wheel steering angle does not need to be corrected by the driver, the optimal braking strategy comprises that energy consumption of a brake motor is minimum, an execution time of a braking execution mechanism is shortest, and correction by the driver is not needed in an execution process of the braking execution mechanism; and the optimal driving strategy comprises that energy consumption of a hub motor is minimum, an execution time of a driving execution mechanism is shortest, and correction by the driver is not needed in an execution process of the driving execution mechanism.

4. The drive-by-wire chassis cyber-physical system under an intelligent traffic environment according to claim 1, wherein the ideal operation of the drive-by-wire chassis is data in an ideal operation database, comprising an ideal steering wheel angle, an ideal brake pedal opening degree, and an ideal accelerator pedal opening degree; the ideal steering wheel angle is a magnitude of a steering wheel angle required by a desired path planned by the data analysis module; the ideal brake pedal opening degree is a brake pedal opening degree planned by the data analysis module to maintain a traffic safe distance from ahead and surrounding obstacles and ensure the driving comfort of the driver; and the ideal accelerator pedal opening degree is an accelerator pedal opening degree planned by the data analysis module and meeting a speed requirement of a traffic environment to ensure the driving comfort of the driver and maintain the traffic safety distance from the surrounding obstacles.

5. The drive-by-wire chassis cyber-physical system under an intelligent traffic environment according to claim 1, wherein the ideal operation database is an offline synchronization database, which consists of vehicle engineer experience data, automobile dynamic and kinematic model data, and automobile traveling data in the traffic environment by offline synchronization; the data in the ideal operation database are all within a range of safe driving and ensuring the comfort of the driver; the vehicle engineer experience data comprises driver comfort data under driver steering, braking, driving, steering and braking or driving conditions, and nonlinear mathematical model data of driver steering, braking and driving operating force as well as the vehicle speed and acceleration; the automobile dynamic and kinematic model comprises a dynamic and kinematic equation during steering, braking, and driving execution calculated by Newton's laws of motion, and current equations of a steering execution motor, a brake motor, a driving motor and a hub motor during steering, braking and driving execution calculated by a Kirchhoff's law; and the automobile traveling data in the traffic environment is driving information data stored by a networked drive-by-wire chassis automobile in a networked condition.

6. The drive-by-wire chassis cyber-physical system under an intelligent traffic environment according to claim 1, wherein: when the brake pedal is stepped on, the stroke and force sensor of the brake pedal works, a brake controller will collect and transmit stroke and force sensor information of the brake pedal to a braking control unit, and the braking control unit controls current output of the brake motor according to the sensor information, and then controls the execution state of the braking execution mechanism to realize braking of the vehicle; and the brake controller is connected to the hub motor to control a rotation state of the wheels during braking.

7. A control method of a drive-by-wire chassis cyber-physical system under an intelligent traffic environment, based on the system according to claim 1, comprising the following steps:
1) issuing an operating signal by the driver;
2) obtaining information of the environment perception module of the drive-by-wire chassis and sensor information of the driver input module;
3) judging, by the basic control module, the driver operation according to the sensor information of the driver input module, and transmitting driver operation information and the information of the environment perception module to the supervision platform;
4) performing, by the supervision platform, real-time monitoring and diagnosis on information of the drive-by-wire chassis, and judging whether a current driver operation conforms to a current working condition; transmitting the information of the driver operation and the environment perception module obtained by the supervision platform to the big data platform in responding to availability of the current driver operation conforms to a current working condition; and, adjusting, by the supervision platform, the driver operation according to the information of the one or more computer processors to conform to the current working condition, and transmitting the information of one or more computer processors and the adjusted driver operation information to the big data platform;
5) storing, by the big data platform, the operation information transmitted by the supervision platform;
6) analyzing, by the big data platform, the driver operation information transmitted by the supervision platform; feeding back the driver operation information to the supervision platform in response to an analysis result of the driver operation information in the supervision platform as an ideal driving operation; and feeding back the ideal driving operation information obtained by data analysis to the supervision platform in response to an error between the analysis result of the driver operation information and the ideal driving operation information;

7) forming, by the supervision platform, a real-time local optimal solution for the vehicle according to the feedback information, and feeding back the local optimal solution to a drive-by-wire chassis supervised by the current supervision platform; and 8) generating, by the, an optimal traveling strategy corresponding to the local optimal solution, and transmitting the optimal traveling strategy to the steering control unit, the braking control unit and the driving control unit to control an output current of a motor in the execution module, so that a controller controls other execution mechanisms in the execution module to complete output to the vehicle.

8. The control method of a drive-by-wire chassis cyber-physical system under an intelligent traffic environment according to claim 7, wherein in step 2), a current steering wheel angle and torque, a wheel steering angle, a brake pedal stroke, and an accelerator pedal stroke of the vehicle are obtained through a sensor, and information outside the vehicle, information about a road condition ahead, position information, vehicle-to-vehicle communication information, and vehicle-to-base station communication information under the current working condition are obtained through the detection device, the positioning device and the communication device in the environment perception module.

9. The control method of a drive-by-wire chassis cyber-physical system under an intelligent traffic environment according to claim 7, wherein in step 4), if a supervision platform of any road fails, a supervision platform of any other road takes over data information of the failed supervision platform to perform real-time monitoring and diagnosis on drive-by-wire chassis in a current road and a road corresponding to the failed supervision platform to ensure stability of the traffic environment information.

10. The control method of a drive-by-wire chassis cyber-physical system under an intelligent traffic environment according to claim 7, wherein in step 6), one or more computer processors are configured to controls the steering, braking, and to drive the hub motor, the steering execution motor and the brake motor to output additional control quantities to minimize the error between the driver operation and the ideal driving operation; and a control algorithm executed by the one or more computer processors is an H∞ feedback control algorithm, which comprises:

61) expressing a deviation between a steering wheel angle $\theta_{sw}$ output by the driver and an ideal steering wheel angle $\theta_{sw}^*$ as $e_1$; expressing a deviation between a brake pedal opening degree p output by the driver and an ideal brake pedal opening degree p as $e_2$; and expressing a deviation between an accelerator pedal opening degree q output by the driver and an ideal accelerator pedal opening degree q* as $e_3$;

62) The deviations $e_1$, $e_2$ and $e_3$ being input of an H∞ feedback controller K(s), calculating, by the feedback controller K(s), additional steering angles $\theta_1$, $\theta_2$ and $\theta_3$ needing to be output by the steering execution motor, the brake motor and the hub motor according to the input deviation $e_1$, $e_2$ and $e_3$, and then controlling, by the central control unit, the steering control unit, the braking control unit and the driving control unit respectively, the steering execution motor, the brake motor and the hub motor to output the corresponding additional steering angles $\theta_1$, $\theta_2$ and $\theta_3$;

63) Enabling the additional steering angles $\theta_1$, $\theta_2$ and $\theta_3$ to act on the drive-by-wire chassis system to further affect a traveling state of the vehicle, and meanwhile, performing, by the driver, a corresponding driving operation according to a current vehicle state so as to obtain a new set of deviations $e_4$, $e_5$ and $e_6$; and 64) repeating steps 61)-63) until the deviations $e_i$ are eliminated, and i=1, 2, 3, . . . .

* * * * *